US010466827B2

(12) United States Patent
Ando et al.

(10) Patent No.: US 10,466,827 B2
(45) Date of Patent: Nov. 5, 2019

(54) TOUCH SENSOR HAVING PIEZOELECTRIC DETECTING ELECTRODES AND POSITION DETECTING ELECTRODES THAT DO NOT OVERLAP EACH OTHER

(71) Applicant: Murata Manufacturing Co., Ltd., Nagaokakyo-shi, Kyoto-fu (JP)

(72) Inventors: Masamichi Ando, Nagaokakyo (JP); Hidekazu Kano, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 26 days.

(21) Appl. No.: 15/068,852

(22) Filed: Mar. 14, 2016

(65) Prior Publication Data
US 2016/0195971 A1 Jul. 7, 2016

Related U.S. Application Data

(63) Continuation of application No. PCT/JP2014/074039, filed on Sep. 11, 2014.

(30) Foreign Application Priority Data

Sep. 20, 2013 (JP) .................................. 2013-195143

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 2203/04105* (2013.01)

(58) Field of Classification Search
CPC ......... G06F 2203/04105; G06F 3/0414; G06F 3/044
See application file for complete search history.

(56) References Cited

U.S. PATENT DOCUMENTS 6,002,389 A * 12/1999 Kasser .................... G06F 3/041
178/18.01
7,920,225 B2 * 4/2011 Nishikawa ............ G06F 1/1626
349/11
(Continued)

FOREIGN PATENT DOCUMENTS

| JP | 05-061592 A | 3/1993 |
| JP | 2009110247 A | 5/2009 |

(Continued)

OTHER PUBLICATIONS

International Search Report for PCT/JP2014/074039 dated Nov. 25, 2014.
Written Opinion for PCT/JP2014/074039 dated Nov. 25, 2014.

*Primary Examiner* — Ram A Mistry
(74) *Attorney, Agent, or Firm* — Arent Fox LLP (57) ABSTRACT

A touch sensor that includes a pressure detection sensor and a position detection sensor. The pressure detection sensor and the position detection sensor are sequentially disposed from an operation surface side of the touch sensor. The position detection sensor includes a dielectric substrate, first position detecting electrodes on a first principal surface of the dielectric substrate, and second position detecting electrodes on a second principal surface of the dielectric substrate. The pressure detection sensor includes a piezoelectric film, a first piezoelectric detecting electrode on a first principal surface of the piezoelectric film, and a second piezoelectric detecting electrode on a second principal surface of the piezoelectric film. The first and second piezoelectric detecting electrodes are disposed so as to not overlap the first and second position detecting electrodes.

9 Claims, 5 Drawing Sheets

(56) References Cited

U.S. PATENT DOCUMENTS

| | | | |
|---|---|---|---|
| 2009/0289529 A1* | 11/2009 | Ito | G01L 1/16 310/365 |
| 2011/0057904 A1 | 3/2011 | Yamano | |
| 2011/0148811 A1 | 6/2011 | Kanehira et al. | |
| 2011/0278078 A1 | 11/2011 | Schediwy et al. | |
| 2012/0075226 A1* | 3/2012 | Andoh | G06F 3/046 345/173 |
| 2012/0133496 A1* | 5/2012 | Aono | G06F 3/016 340/407.2 |
| 2013/0027339 A1 | 1/2013 | Kodani et al. | |
| 2013/0027340 A1* | 1/2013 | Kodani | G06F 3/041 345/173 |
| 2013/0068038 A1* | 3/2013 | Bolender | G01L 1/142 73/862.626 |
| 2013/0147739 A1 | 6/2013 | Aaberg et al. | |
| 2015/0015526 A1* | 1/2015 | Wang | G06F 3/044 345/174 |
| 2015/0346881 A1 | 12/2015 | Watazu | |
| 2016/0195971 A1 | 7/2016 | Ando et al. | |

FOREIGN PATENT DOCUMENTS

| | | |
|---|---|---|
| JP | 2011059822 A | 3/2011 |
| JP | 5950052 B2 | 7/2016 |
| WO | WO 2011125388 A1 | 10/2011 |
| WO | WO 2011125389 A1 | 10/2011 |
| WO | WO 2014109257 A1 | 7/2017 |

\* cited by examiner

TOUCH SENSOR HAVING PIEZOELECTRIC DETECTING ELECTRODES AND POSITION DETECTING ELECTRODES THAT DO NOT OVERLAP EACH OTHER

CROSS REFERENCE TO RELATED APPLICATIONS

The present application is a continuation of International application No. PCT/JP2014/074039, filed Sep. 11, 2014, which claims priority to Japanese Patent Application No. 2013-195143, filed Sep. 20, 2013, the entire contents of each of which are incorporated herein by reference.

FIELD OF THE INVENTION

The present invention relates to a touch sensor that detects a touch position on an operation surface and detects push-in on the operation surface.

BACKGROUND OF THE INVENTION

Conventionally, there have been proposed various touch type input devices that detect operation input by an operator touching on an operation surface. Some touch type input devices detect a touch position in the operation surface and a pressure or a pressing amount of the operation surface.

For example, a touch type input device disclosed in PTL 1 has a structure in which a flat pressure sensor (pressure detection sensor) and a flat electrostatic type position detection sensor overlap each other. The pressure detection sensor detects the push-in and a pressing force, and the electrostatic type position detection sensor detects the operation position.

In the touch type input device disclosed in PTL 1, an electrostatic type position detection sensor and a pressure detection sensor are sequentially disposed from the operation surface side.

PTL 1: Unexamined Japanese Patent Publication No. 5-61592

SUMMARY OF THE INVENTION

Sometimes it is necessary not to sequentially dispose the electrostatic type position detection sensor and the pressure detection sensor from the operation surface side, but to sequentially dispose the pressure detection sensor and the electrostatic type position detection sensor. In such cases, the pressure detection sensor is interposed between something (such as a finger) coming into touch with the operation surface and the electrostatic type position detection sensor.

However, in the conventional pressure detection sensor disclosed in PTL 1, the piezoelectric detecting electrodes are provided in the substantially whole principal surfaces of a flat-film piezoelectric material. Therefore, the piezoelectric detecting electrode acts as an electromagnetic shield against the electrostatic type position detection sensor, and detection sensitivity of the touch of the finger or the like largely degrades, or the touch of the finger or the like can hardly be detected.

An object of the present invention is to provide a touch sensor that can more surely detect the touch of the finger or the like on the operation surface.

One of the features of a touch sensor of the present invention has the following configuration. A touch type input device includes a pressure detection sensor that includes a piezoelectric film in which piezoelectric detecting electrodes are arranged on opposed sides thereof; and an electrostatic type position detection sensor that includes a dielectric substrate in which position detecting electrodes are arranged on opposed sides thereof. The pressure detection sensor and the electrostatic type position detection sensor are sequentially disposed from an operation surface side of the touch sensor. The piezoelectric detecting electrode is disposed at a position different from the position detecting electrode when viewed in a direction orthogonal to the operation surface.

In the above configuration, the electrode does not exist between the operation surface and the electrostatic type position detection sensor in a position detection range. Accordingly, static electricity of the finger or the like can be detected with high sensitivity by the position detecting electrode of the electrostatic type position detection sensor. The electrostatic type position detection sensor does not exist between the operation surface and the pressure detection sensor, so that a variation in pressure detection sensitivity can be suppressed, the variation in pressure detection sensitivity being caused by a temperature generated by the disposition of the electrostatic type position detection sensor.

The piezoelectric detecting electrode may be formed into a cyclic shape along an outer periphery of the principal surface of the piezoelectric film, and the position detecting electrode may be formed in a region on an inside of the cyclic piezoelectric detecting electrode.

The piezoelectric detecting electrode may be formed at least a part along an outer periphery of the principal surface of the piezoelectric film.

These configurations illustrate examples of the disposition pattern of the piezoelectric detecting electrode, and the piezoelectric detecting electrode is provided in the outer periphery region surrounding the central region where the position is detected, whereby the position detecting electrode and the piezoelectric detecting electrode do not overlap each other. In the case that the operation surface is fixed along the outer periphery, a strain increases in the outer periphery in which the piezoelectric detecting electrode is disposed when the central region is pressed. Therefore, the pressing force can be detected with higher sensitivity.

In the touch sensor of the present invention, the piezoelectric detecting electrode may be formed in an insulating film, and the insulating film may be mounted on both the principal surfaces of the piezoelectric film.

In the above configuration, because it is not easy to directly form the piezoelectric detecting electrode in the piezoelectric film, the piezoelectric detecting electrode is formed in the insulating film to abut on the piezoelectric film, which allows the pressure detection sensor to be easily made.

In the touch sensor of the present invention, preferably the insulating film located on the side of the electrostatic type position detection sensor with respect to the piezoelectric film includes an opening in a region different from the region where the piezoelectric detecting electrode is formed, and the electrostatic type touch sensor abuts on the piezoelectric film in the opening.

In the above configuration, in an aspect including the insulating film, the electrostatic type position detection sensor can directly abut on the piezoelectric film by providing the opening in the central region of the insulating film, and the touch type input device can be thinned by thicknesses of the insulating film and piezoelectric detecting electrode.

In the touch sensor of the present invention, preferably the piezoelectric film is made of polylactic acid stretched in a uniaxial direction.

In the configuration, the touch sensor has the high translucency, and sensitivity of pressure detection can be improved.

Accordingly, in the present invention, the touch position of the finger or the like on the operation surface can surely be detected even in the configuration in which the pressure detection sensor is disposed on the operation surface side of the electrostatic type position detection sensor.

DETAILED DESCRIPTION OF THE INVENTION

Figure 1:
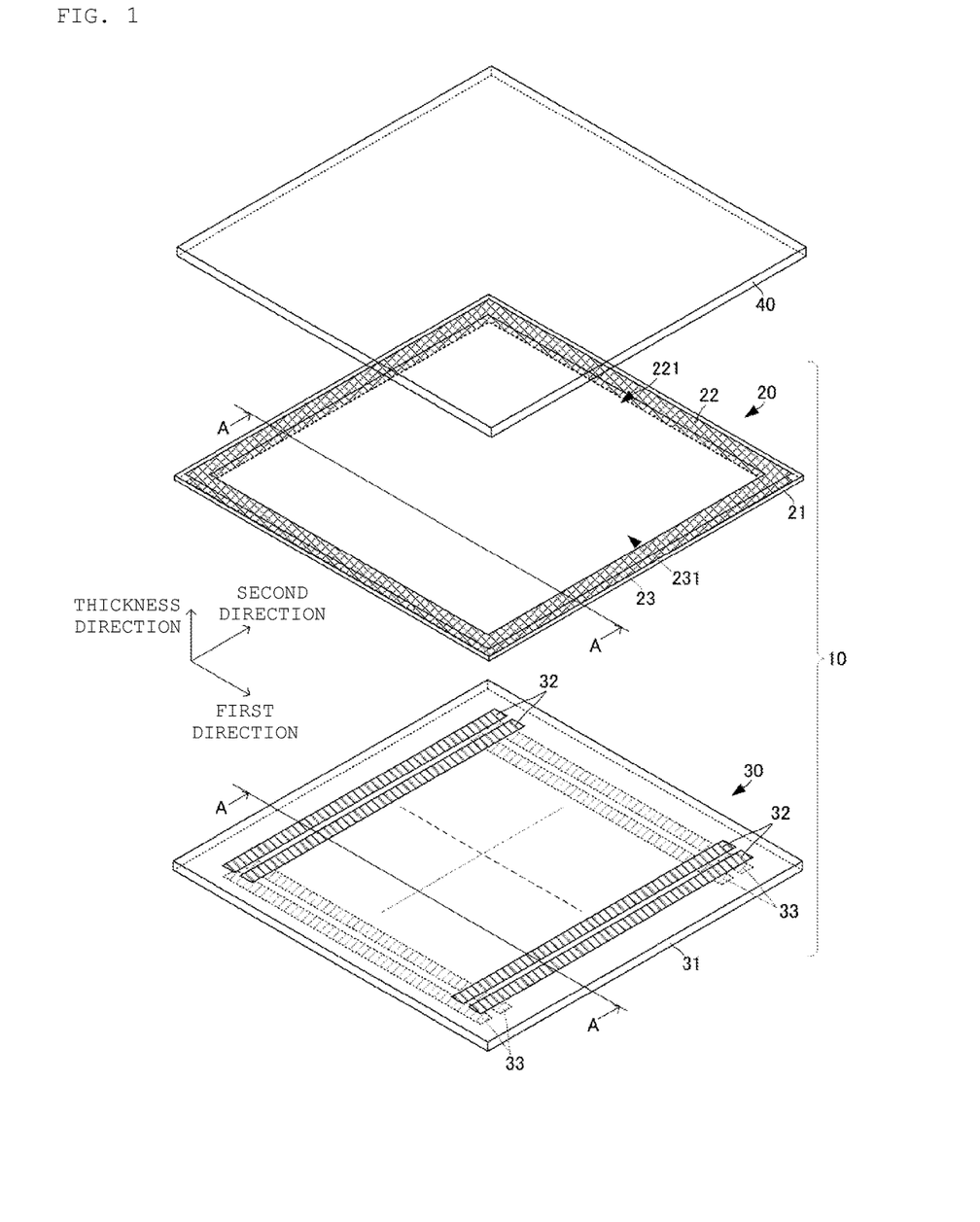
FIG. 1 is an exploded perspective view illustrating a touch sensor according to a first embodiment of the present invention.
Figure 2:
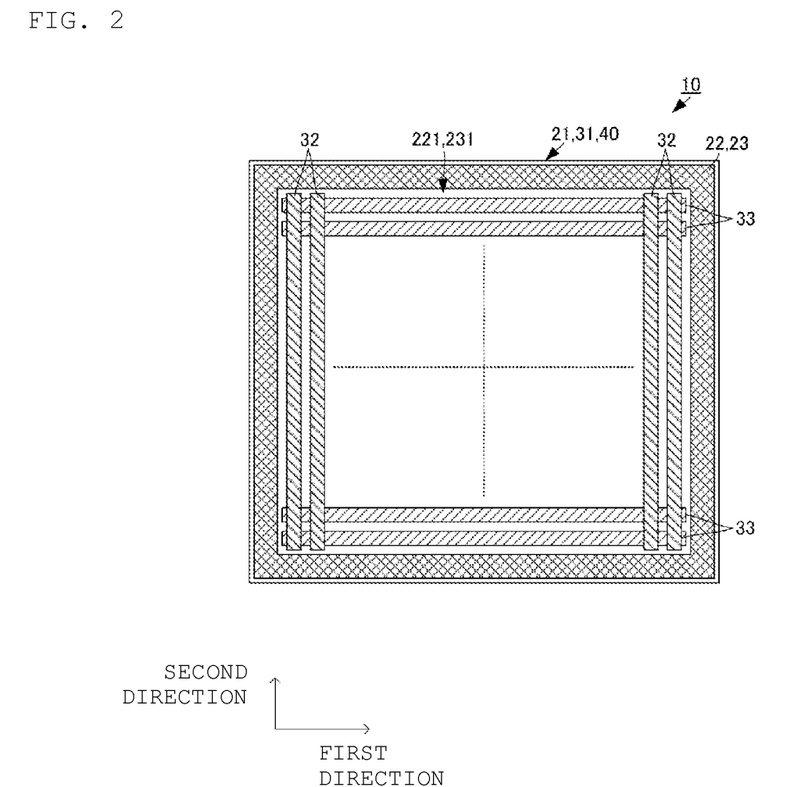
FIG. 2 is a plan view illustrating a positional relationship among electrodes of the touch sensor according to the first embodiment of the present invention.
Figure 3:
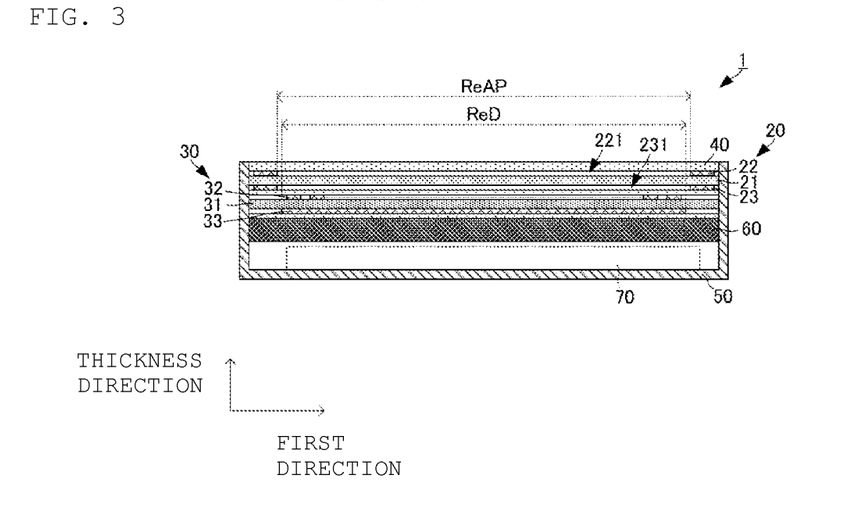
FIG. 3 is a sectional view illustrating a touch type input device provided with the touch sensor according to the first embodiment of the present invention.

Hereinafter, a touch sensor according to a first embodiment of the present invention will be described with reference to the drawings. FIG. 1 is an exploded perspective view illustrating the touch sensor of the first embodiment of the present invention. FIG. 2 is a plan views illustrating a positional relationship among electrodes of the touch sensor according to the first embodiment of the present invention. FIG. 3 is a sectional view illustrating a touch type input device provided with the touch sensor of the first embodiment of the present invention. FIG. 3 is a sectional view of the touch type input device when viewing a portion corresponding to a line A-A of the touch sensor in FIG. 1.

A touch sensor 10 includes a pressure detection sensor 20 and a position detection sensor 30. The pressure detection sensor 20 and the position detection sensor 30 have a rectangular flat shape in a planar view. The pressure detection sensor 20 and the position detection sensor 30 are stacked on each other such that principal surfaces of the sensors 20 and 30 are parallel to each other. A cover member 40 is disposed in a surface on an opposite side to the position detection sensor 30 with respect to the pressure detection sensor 20. That is, as illustrated in FIG. 3, the touch sensor 10 has a structure in which the pressure detection sensor 20 and the position detection sensor 30 are sequentially stacked from the side of the cover member 40. The cover member 40 is made of a glass plate or an acrylic plate, and has light transmittance and an insulating characteristic.

The touch sensor 10 having the above configuration is incorporated as a part of a touch type input device 1 as illustrated in FIG. 3. The touch type input device 1 includes a chassis 50 having a substantially rectangular parallelepiped shape. A surface side of the chassis 50 is opened. The touch sensor 10 (a laminated body of the pressure detection sensor 20 and the position detection sensor 30), the cover member 40, a display panel 60, and an arithmetic circuit module 70 that configures a controller are disposed in the chassis 50. The cover member 40, the touch panel 10, the display panel 60, and the arithmetic circuit module 70 are disposed along a thickness direction in the order from an opening (the operation surface and the display surface) side of the chassis 50.

The display panel 60 is constructed with a thin display such as a liquid crystal panel and an organic EL panel. The arithmetic circuit module 70 calculates an operation position and the pressing force from detection signals output from the pressure detection sensor 20 and the position detection sensor 30.

A specific configuration of the touch panel 10 will be described below.

The pressure detection sensor 20 of the touch panel 10 includes a piezoelectric film 21, a first piezoelectric detecting electrode 22, and a second piezoelectric detecting electrode 23. The piezoelectric film 21 is a rectangular film made of a chiral polymer. In the embodiment, polylactic acid (PLA), particularly poly-L-lactic acid (PLLA) is used as the chiral polymer. PLLA is stretched in a uniaxial direction. A uniaxially-stretching direction forms about 45° with respect to two sides (sides in first and second directions) that are orthogonal to each other to constitute a rectangle. An angle formed by the uniaxially-stretching direction may properly be adjusted, and the angle of 45° is most favorably formed when only both ends in one of X- and Y-directions of the touch sensor 10 are fixed to the chassis 50 or when the touch sensor 10 is fixed along an outer periphery.

A main chain of PLLA that is of the chiral polymer has a helical structure.

When PLLA is stretched in the uniaxial direction to orient molecules, PLLA has piezoelectricity. The uniaxially-stretched PLLA generates a charge by pressing a flat plate surface of the piezoelectric film. At this point, the generated charge amount depends on a displacement amount of the flat plate surface that is displaced in a direction orthogonal to the flat plate surface by a press amount (push-in amount). A piezoelectric constant of the uniaxially-stretched PLLA falls into a category of extremely high piezoelectric constant in polymers. Accordingly, the displacement caused by the press can be detected with high sensitivity using PLLA as the piezoelectric film 21.

Preferably a stretching ratio ranges from about 3 times to about 8 times. When a heat treatment is performed after the stretching, crystallization of an extended chain crystal of polylactic acid is promoted to improve the piezoelectric constant. For biaxial stretching, an effect similar to that of the uniaxial stretching can be obtained by varying the stretching ratio in each axis. For example, when the stretching ratio of 8 times is set to a first axial direction while the stretching ratio of 2 times is set to a second axial direction orthogonal to the first axial direction, the effect similar to that of the uniaxial stretching in which the stretching ratio of 4 times is set to the first axial direction is obtained with respect to the piezoelectric constant. That is, the uniaxially-stretching direction means the most stretched direction including the case in which the piezoelectric film is stretched in a plurality of directions. Because the simply uniaxially-stretched film tears easily along the stretching-axis direction, strength can be increased to a certain degree by biaxial stretching.

In PLLA, the piezoelectricity is generated by a molecule orientation process such as the stretching, and it is not necessary to perform a polarization process unlike other polymers such as PVDF and other piezoelectric ceramics. The piezoelectricity of PLLA that does not belong to a ferroelectric material is not developed by ion polarization unlike ferroelectric materials such as PVDF and PZT, but is derived from a helical structure that is of a characteristic structure of a molecule. Therefore, pyroelectricity generated in other ferroelectric piezoelectric materials is not generated in PLLA. Furthermore, the piezoelectric constant of PLLA is extremely stable over time, although in PVDF and the like, a variation in piezoelectric constant is observed over time, and sometimes the piezoelectric constant decreases markedly. Accordingly, irrespective of a surrounding environment, the displacement caused by the press can be detected with high sensitivity.

PLLA is an organic piezoelectric material having the high translucency. Accordingly, translucency of the piezoelectric film 21 can be enhanced.

The first piezoelectric detecting electrode 22 is disposed on a first principal surface of the piezoelectric film 21. The first principal surface of the piezoelectric film 21 is a surface located on the side of the cover member 40 with respect to the piezoelectric film 21. As illustrated in FIGS. 1 and 2, the first piezoelectric detecting electrode 22 has a cyclic and belt-like shapes, and is disposed along an outer periphery of the first principal surface of the piezoelectric film 21. In other words, the first piezoelectric detecting electrode 22 is not disposed in a central region of the first principal surface of the piezoelectric film 21, but is disposed near the outer periphery of the first principal surface.

That is, the first piezoelectric detecting electrode 22 includes an opening 221 in a central region thereof.

The second piezoelectric detecting electrode 23 is disposed on a second principal surface of the piezoelectric film 21. The second principal surface of the piezoelectric film 21 is a surface located on the side of the electrostatic type position detection sensor 30 of the piezoelectric film 21. As illustrated in FIGS. 1 and 2, similarly to the first piezoelectric detecting electrode 22, the second piezoelectric detecting electrode 23 has the cyclic and belt-like shapes, and is disposed along the outer periphery of the second principal surface of the piezoelectric film 21. In other words, the second piezoelectric detecting electrode 23 is not disposed in the central region of the second principal surface of the piezoelectric film 21, but is disposed near the outer periphery of the second principal surface. That is, the second piezoelectric detecting electrode 23 includes an opening 231 in the central region thereof.

The first and second piezoelectric detecting electrodes 22 and 23 are disposed so as to face each other with the piezoelectric film 21 interposed therebetween. At this point, although preferably wholes of the first and second piezoelectric detecting electrodes 22 and 23 are disposed so as to face each other, at least a part of the first and second piezoelectric detecting electrodes 22 and 23 may be disposed so as to face each other.

Therefore, a central region ReAP of the pressure detection sensor 20 has a structure only of the piezoelectric film 21 in a plan view, and the outer peripheral region surrounding the central region ReAP has a structure in which the piezoelectric film 21 is sandwiched between the first and second piezoelectric detecting electrodes 22 and 23.

In the configuration, the piezoelectric film 21 is distorted to generate the charge, when the cover member 40 is pushed in to apply a stress to the piezoelectric film 21. The first piezoelectric detecting electrode 22 and the second piezoelectric detecting electrode 23 detect the charge to generate a detection voltage signal, which allows the detection of the pressing force. At this point, it is found that a large strain is generated near the outer periphery of the piezoelectric film 21 when a side along a first direction of the piezoelectric film 21, a side along a second direction, or the outer periphery is fixed. Accordingly, the pressing force can be detected with high sensitivity even if the first and second piezoelectric detecting electrodes 22 and 23 are disposed only near the outer periphery of the piezoelectric film 21.

The central region ReAP of the pressure detection sensor 10 is only constructed with the piezoelectric film 21, so that translucency of the central region ReAP can be enhanced. Accordingly, an amount of light that is output from the display panel 60 to reach the operation surface (the surface of the cover member 40) can be enhanced.

Either an inorganic electrode such as ITO, ZnO, a silver nanowire, a carbon nanotube, and graphene or an organic electrode mainly containing polythiophene, polyaniline, and the like may be used as the first and second piezoelectric detecting electrodes 22 and 23. In this case, the first and second piezoelectric detecting electrodes 22 and 23 have the translucency, and a display image generated by the display panel 60 can be displayed on the operation surface with a substantially direct light amount even if the pressure detection sensor 20 has a specification in which the outer peripheral region is seen from the operation surface side. On the other hand, an electrode film, such as an aluminum evaporation film, which has no translucency can be used unless the pressure detection sensor 20 has the specification in which the outer peripheral region is seen from the operation surface side. In this case, preferably a material having conductivity as high as possible is used as the first and second piezoelectric detecting electrodes 22 and 23.

The position detection sensor 30 includes a dielectric substrate 31, a first position detecting electrode 32, and a second position detecting electrode 33. The dielectric substrate 31 is made of a rectangular insulating material having the translucency.

The first position detecting electrode 32 has an elongated shape, and is disposed on the first principal surface of the dielectric substrate 31 such that the elongated direction of the first position detecting electrode 32 is parallel to the second direction of the dielectric substrate 31 (touch sensor 10). The first principal surface of the dielectric substrate 31 is a surface located on the side of the pressure detection sensor 20 with respect to the dielectric substrate 31. The plurality of first position detecting electrodes 32 are disposed at intervals along the first direction of the dielectric substrate 31 (touch sensor 10).

The second position detecting electrode 33 has the elongated shape, and is disposed in the second principal surface of the dielectric substrate 31 such that the elongated direction of the second position detecting electrode 33 is parallel to the first direction of the dielectric substrate 31 (touch sensor 10). The second principal surface of the dielectric substrate 31 is a surface located on the opposite side to the pressure detection sensor 20 with respect to the dielectric substrate 31. The plurality of second position detecting electrodes 33 are disposed at intervals along the second direction of the dielectric substrate 31 (touch sensor 10).

In the configuration, a user's finger touches or comes close to the operation surface to change an electrostatic capacitance, which changes an electrostatic capacitance between the first and second position detecting electrodes 32 and 33. At this point, the electrostatic capacitance most largely changes in a region where the first and second position detecting electrodes 32 and 33 located closest to the finger face each other. Accordingly, the operation position can be detected by detecting a combination of the first and second position detecting electrodes 32 and 33 in the region where the largest change in electrostatic capacitance is generated.

The first and second position detecting electrodes 32 and 33 are made of a translucent material such as ITO. Therefore, the position detection sensor 30 having the translucency can be made, and the light output from the display panel 60 can be transmitted onto the operation surface side.

The first and second position detecting electrodes 32 and 33 are arrayed in the central region ReAP of the pressure detection sensor 20 when the touch sensor 10 is viewed from above. That is, the first and second piezoelectric detecting electrodes 22 and 23 are disposed in the outer periphery of a region (position detection region) ReD where the first and second position detecting electrodes 32 and 33 are arrayed.

According to the configuration, in the region (position detection region) ReD where the first and second position detecting electrodes 32 and 33 are arrayed, no electrode exists between the operation surface and the position detection sensor 30 when the touch sensor 10 is viewed from above. Accordingly, unlike the conventional configuration, the first and second piezoelectric detecting electrodes 22 and 23 of the pressure detection sensor 20 does not constitute the shield when the electrostatic type position detection sensor 30 detects static electricity of a finger.

The position detection sensor 30 can detect a change in electrostatic capacity with high sensitivity when the finger comes into touch with or close to the operation surface.

As described above, the touch sensor detecting the touch position and the pressing force with high sensitivity can be made using the configuration of the first embodiment. At this point, the touch sensor having the translucency can be made when the translucent material is used in the pressure detection sensor 20 (at least the piezoelectric film 21) and the position detection sensor 30. The use of the touch sensor having the translucency can display the display image of the display panel 60 on the operation surface without degrading the display image, even if the touch sensor is disposed between the display panel 60 and the operation surface as illustrated in FIG. 3. Particularly, in the case that a display image range of the display panel 60 is equal to the position detection region ReD of the position detection sensor 30, the pressure detection sensor 20 is constructed only with the piezoelectric film 21 in the position detection region ReD, so that the display image can more clearly be displayed on the operation surface.

As illustrated in FIG. 3, an insulating layer is disposed between the pressure detection sensor 20 and the position detection sensor 30. For example, a bonding agent bonding the pressure detection sensor 20 and the position detection sensor 30 may be used as the insulating layer.

Figure 4:
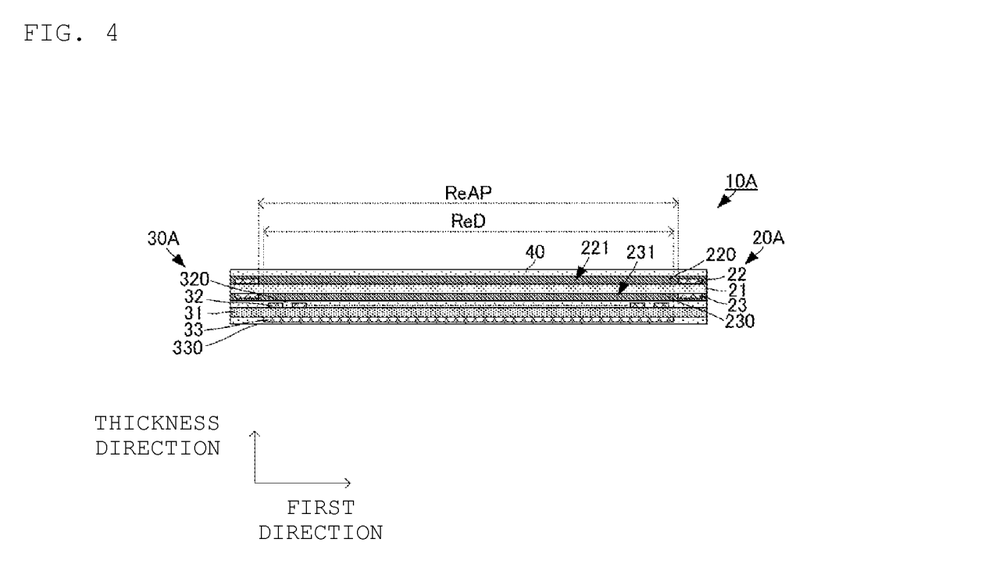
FIG. 4 is a sectional view illustrating a side surface of a touch sensor according to a second embodiment of the present invention.

A touch sensor according to a second embodiment of the present invention will be described below with reference to FIG. 4. FIG. 4 is a sectional view illustrating a side surface of the touch sensor according to the second embodiment of the present invention.

A touch sensor 10A of the second embodiment differs from the touch sensor 10 of the first embodiment in configurations of a pressure detection sensor 20A and a position detection sensor 30A, and other configurations of the touch sensor 10A are identical to those of the touch sensor 10. Accordingly, only different point will specifically be described below.

The pressure detection sensor 20A includes insulating films 220 and 230. The insulating films 220 and 230 have the translucency. The first piezoelectric detecting electrode 22 is formed in one of principal surfaces of the insulating film 220. The insulating film 220 is mounted on the first principal surface of the piezoelectric film 21 such that the first piezoelectric detecting electrode 22 abuts on the piezoelectric film 21. The second piezoelectric detecting electrode 23 is formed in one of principal surfaces of the insulating film 230. The insulating film 230 is mounted on the second principal surface of the piezoelectric film 21 such that the second piezoelectric detecting electrode 23 abuts on the piezoelectric film 21. In the configuration of the second embodiment, it is not necessary to form the first and second piezoelectric detecting electrodes 22 and 23 of the piezoelectric film 21, and the pressure detection sensor 20A can easily be formed.

The position detection sensor 30A includes insulating films 320 and 330. The insulating films 320 and 330 have the translucency. The insulating film 320 is mounted on the first principal surface of the dielectric substrate 31 so as to cover the dielectric substrate 31 and the first position detecting electrode 32. The insulating film 330 is mounted on the second principal surface of the dielectric substrate 31 so as to cover the dielectric substrate 31 and the second position detecting electrode 33.

Similarly to the first embodiment, the touch sensor detecting the touch position and the pressing force with high sensitivity can be made using the configuration of the second embodiment. The pressure detection sensor 20A can easily be formed, and therefore the touch sensor 10A can easily be made.

Figure 5:
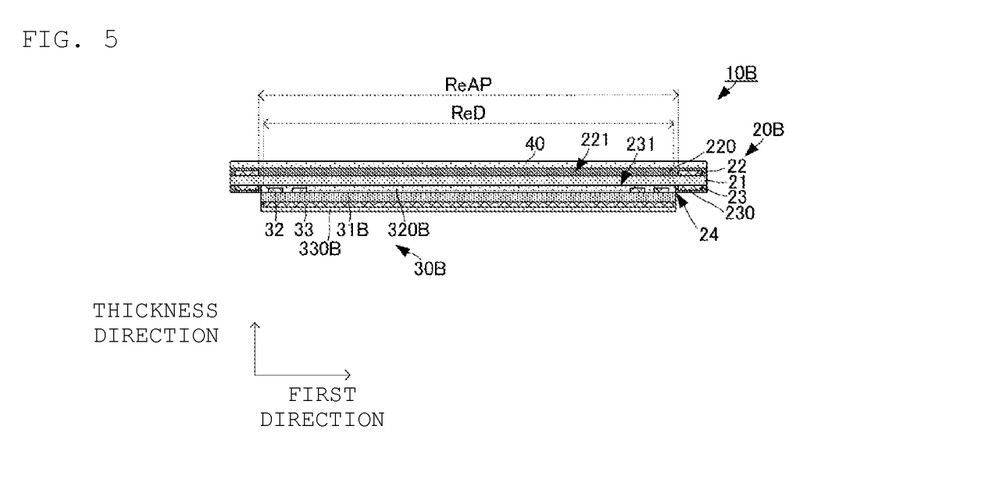
FIG. 5 is a sectional view illustrating a side surface of a touch sensor according to a third embodiment of the present invention.

A touch sensor according to a third embodiment of the present invention will be described below with reference to FIG. 5. FIG. 5 is a sectional view illustrating a side surface of the touch sensor of the third embodiment of the present invention.

A touch sensor 10B of the third embodiment differs from the touch sensor 10A of the second embodiment in configurations of a pressure detection sensor 20B and a position detection sensor 30B, and other configurations of the touch sensor 10B are identical to those of the touch sensor 10A. Accordingly, only a point different from the touch sensor 10A of the second embodiment will specifically be described.

In the pressure detection sensor 20B, a region corresponding to the central region ReAP of the insulating film 230 formed in the second principal surface of the piezoelectric film 21 constitutes an opening 231. In other words, the insulating film 230 is not formed in the central region ReAP of the second principal surface of the piezoelectric film 21.

A dielectric substrate 31B of the position detection sensor 30B has a shape in which the dielectric substrate 31B is fitted in the central region ReAP. An insulating film 320B is mounted on the whole first principal surface of the dielectric substrate 31B, and an insulating film 330B is mounted on the whole second principal surface of the dielectric substrate 31B.

The position detection sensor 30B is disposed in the opening 231 of the pressure detection sensor 20B. Therefore, the position detection sensor 30B directly abuts on the second principal surface of the piezoelectric film 21 of the pressure detection sensor 20B.

In the configuration of the third embodiment, the effect similar to the second embodiment can be obtained, and a lower profile of the touch sensor 10B can be implemented.

Figure 6:
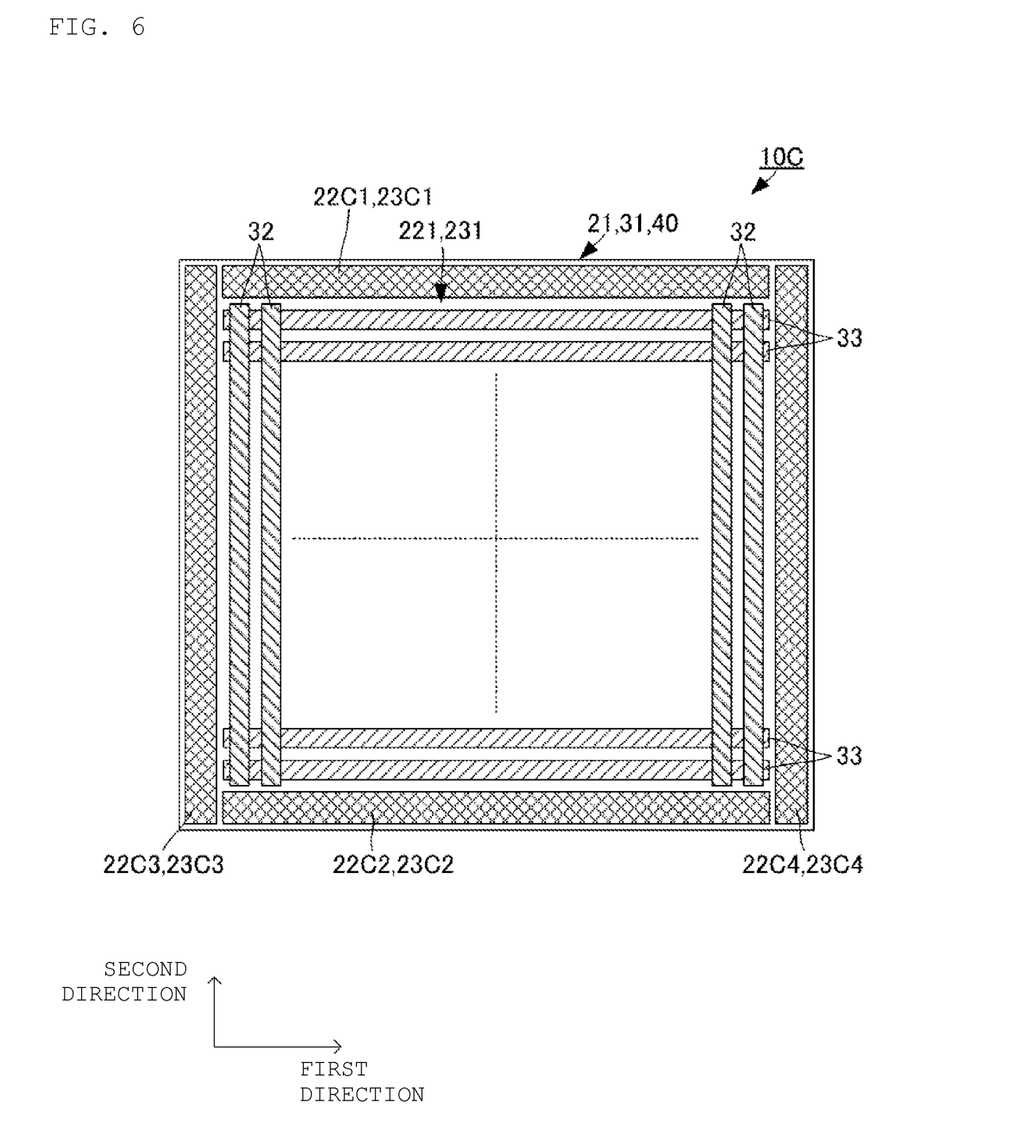
FIG. 6 is a plan view illustrating a positional relationship among electrodes of a touch sensor according to a fourth embodiment of the present invention.

A touch sensor according to a fourth embodiment of the present invention will be described below with reference to FIG. 6. FIG. 6 is a plan views illustrating a positional relationship among electrodes of the touch sensor of the fourth embodiment of the present invention.

A touch sensor 10C of the fourth embodiment differs from the touch sensor 10 of the first embodiment in an electrode pattern of a pressure detection sensor 20C, and other configurations of the touch sensor 10C are identical to those of the touch sensor 10. Accordingly, only a point different from the touch sensor 10 of the first embodiment will specifically be described.

In the pressure detection sensor 20C of the touch sensor 10C, first and second piezoelectric detecting electrodes are constructed with plural partial electrodes.

The first piezoelectric detecting electrode includes partial electrodes 22C1, 22C2, 22C3, and 22C4. Each of the partial electrodes 22C1, 22C2, 22C3, and 22C4 has an elongated shape. Each of the partial electrodes 22C1, 22C2, 22C3, and 22C4 is formed along each end side constituting the outer periphery of the piezoelectric film 21.

The second piezoelectric detecting electrode includes partial electrodes 23C1, 23C2, 23C3, and 23C4. Each of the partial electrodes 23C1, 23C2, 23C3, and 23C4 has an elongated shape. Each of the partial electrodes 23C1, 23C2, 23C3, and 23C4 is formed along each end side constituting the outer periphery of the piezoelectric film 21.

The partial electrode 22C1 and the partial electrode 23C1 face each other with the piezoelectric film 21 interposed therebetween, and the partial electrode 22C2 and the partial electrode 23C2 face each other with the piezoelectric film 21 interposed therebetween. The partial electrode 22C3 and the partial electrode 23C3 face each other with the piezoelectric film 21 interposed therebetween, and the partial electrode 22C4 and the partial electrode 23C4 face each other with the piezoelectric film 21 interposed therebetween.

In the configuration of the fourth embodiment, the effect similar to the first embodiment can be obtained. Additionally, in the configuration of the fourth embodiment, depending on the pressing position of the operation surface, sometimes the direction of a charge generated in the piezoelectric film 21 is reversed between a neighborhood of the end side along the first direction and a neighborhood of the end side along the second direction. At this point, the charges generated in the piezoelectric film 21 can be prevented from canceling each other by individually detecting the charge of each side. Therefore, the pressing force can be detected with higher sensitivity.

Figure 7:
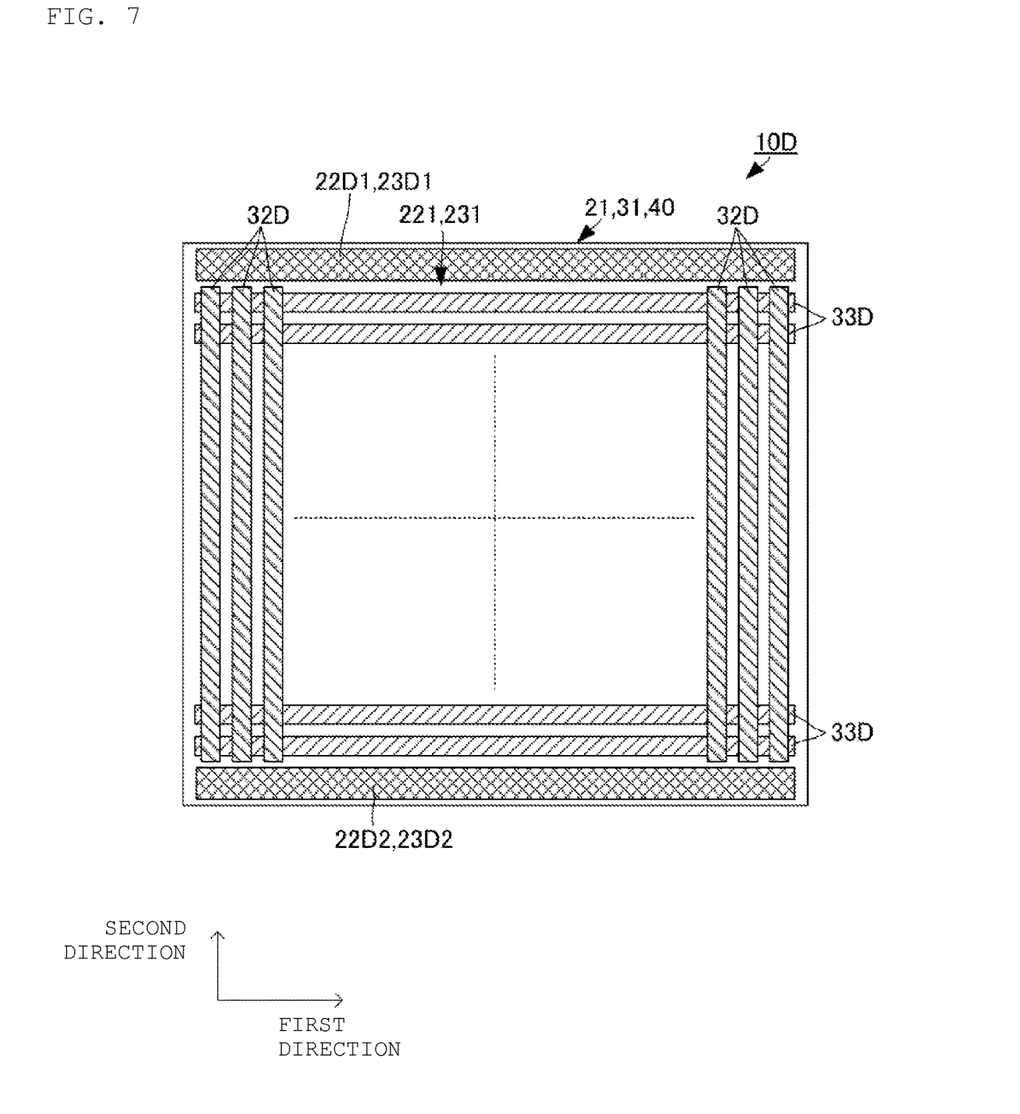
FIG. 7 is a plan view illustrating a positional relationship among electrodes of the touch sensor according to a fifth embodiment of the present invention.

A touch sensor according to a fifth embodiment of the present invention will be described below with reference to FIG. 7. FIG. 7 is a plan views illustrating a positional relationship among electrodes of the touch sensor according to the fifth embodiment.

A touch sensor 10D of the fifth embodiment differs from the touch sensor 10C of the fourth embodiment in the first and second piezoelectric detecting electrodes of the pressure detection sensor and the first and second position detecting electrodes of the position detection sensor, and other configurations of the touch sensor 10D are identical to those of the touch sensor 10C. Accordingly, only a point different from the touch sensor 10C of the fourth embodiment will specifically be described.

The pressure detection sensor of the touch sensor 10D includes partial electrodes 22D1 and 22D2. The partial electrodes 22D1 and 22D2 have a shape elongated along the first direction, and are located near the end side along the first direction in the first principal surface of the piezoelectric film 21. The partial electrodes 22D1 and 22D2 constitute the first piezoelectric detecting electrode.

The pressure detection sensor of the touch sensor 10D includes partial electrodes 23D1 and 23D2. The partial electrodes 23D1 and 23D2 have a shape elongated along the first direction, and are located near the end side along the first direction in the second principal surface of the piezoelectric film 21. The partial electrodes 23D1 and 23D2 constitute the second piezoelectric detecting electrode.

A first position detecting electrode 32D of the position detection sensor is formed between the partial electrodes 22D1 and 22D2, and a second position detecting electrode 33D is formed between the partial electrodes 23D1 and 23D2. At this point, the first and second position detecting electrodes 32D and 33D are arrayed so as to stretch a substantially total length in the first direction of the touch sensor 10D (dielectric substrate 31).

In the configuration of the fifth embodiment, the effect similar to the fourth embodiment can be obtained. Additionally, the first and second position detecting electrodes 32D and 33D are disposed over the total length in the first direction, so that the position detection region can be enlarged without changing a planar area of the touch sensor 10D.

In the above embodiments, the piezoelectric detecting electrodes are disposed along the outer periphery of the piezoelectric film or along the two end sides constituting the outer periphery. However, it is only necessary to form the piezoelectric detecting electrodes along at least one end side. The piezoelectric detecting electrode may be formed so as not to overlap the position detecting electrode when the touch sensor is viewed from above (in the direction orthogonal to the operation surface).

DESCRIPTION OF REFERENCE SYMBOLS

1: touch type input device
10, 10A, 10B, 10C, 10D: touch sensor
20, 20A, 20B, 20C: pressure detection sensor
21: piezoelectric film
22: first piezoelectric detecting electrode
22C1, 22C2, 22C3, 22C4, 22D1, 22D2: partial electrode
23: second piezoelectric detecting electrode
23C1, 23C2, 23C3, 23C4, 23D1, 23D2: partial electrode
30, 30A, 30B: position detection sensor
31, 31B: dielectric substrate
32: first position detecting electrode
33: second position detecting electrode
40: cover member
50: chassis
60: display panel
70: arithmetic circuit module
220, 230: insulating film
231: opening
320, 330, 320B, 330B: insulating film

The invention claimed is:
1. A touch sensor comprising:
a pressure detection sensor that includes a piezoelectric film and first and second piezoelectric detecting electrodes arranged only along an outer periphery on respective opposed principal surfaces of the piezoelectric film, wherein a first side along a first direction of the piezoelectric film, a second side along a second direction of the piezoelectric film orthogonal to the first direction, or a plurality of sides along an outer periphery of the piezoelectric film are fixed; and a position detection sensor that includes a dielectric substrate and first and second position detecting electrodes arranged on respective opposed principal surfaces of the dielectric substrate, wherein the pressure detection sensor and then the position detection sensor are sequentially arranged from an operation surface side of the touch sensor such that the operation surface side, the pressure detection sensor, and the position detection sensor are arranged in this order, and the piezoelectric detecting electrodes and the position detecting electrodes are disposed so as to not overlap each other when viewed in a direction orthogonal to the operation surface.

2. The touch sensor according to claim 1, wherein the position detecting sensor is an electrostatic position detecting sensor.

3. The touch sensor according to claim 1, wherein the piezoelectric detecting electrodes are in a cyclic shape along the outer periphery of the piezoelectric film, and the position detecting electrodes are located in a region on an inside of the cyclic shape.

4. The touch sensor according to claim 1, wherein the piezoelectric detecting electrodes are positioned at least partly along the outer periphery of the piezoelectric film.

5. The touch sensor according to claim 1, further comprising first and second insulating films arranged on the respective opposed principal surfaces of the piezoelectric film and between the first and second piezoelectric detecting electrodes and the piezoelectric film.

6. The touch sensor according to claim 5, wherein, of the first and second insulating films, the insulating film located on the side of the position detection sensor includes an opening within which the position detection sensor is located.

7. The touch sensor according to claim 5, further comprising third and fourth insulating films arranged on the respective opposed sides of the dielectric film and between the first and second position detecting electrodes and the dielectric film.

8. The touch sensor according to claim 7, wherein, of the first and second insulating films, the insulating film located on the side of the position detection sensor includes an opening within which the position detection sensor is located.

9. The touch sensor according to claim 1, wherein the piezoelectric film is made of polylactic acid stretched in a uniaxial direction.

* * * * *